Patented June 14, 1938

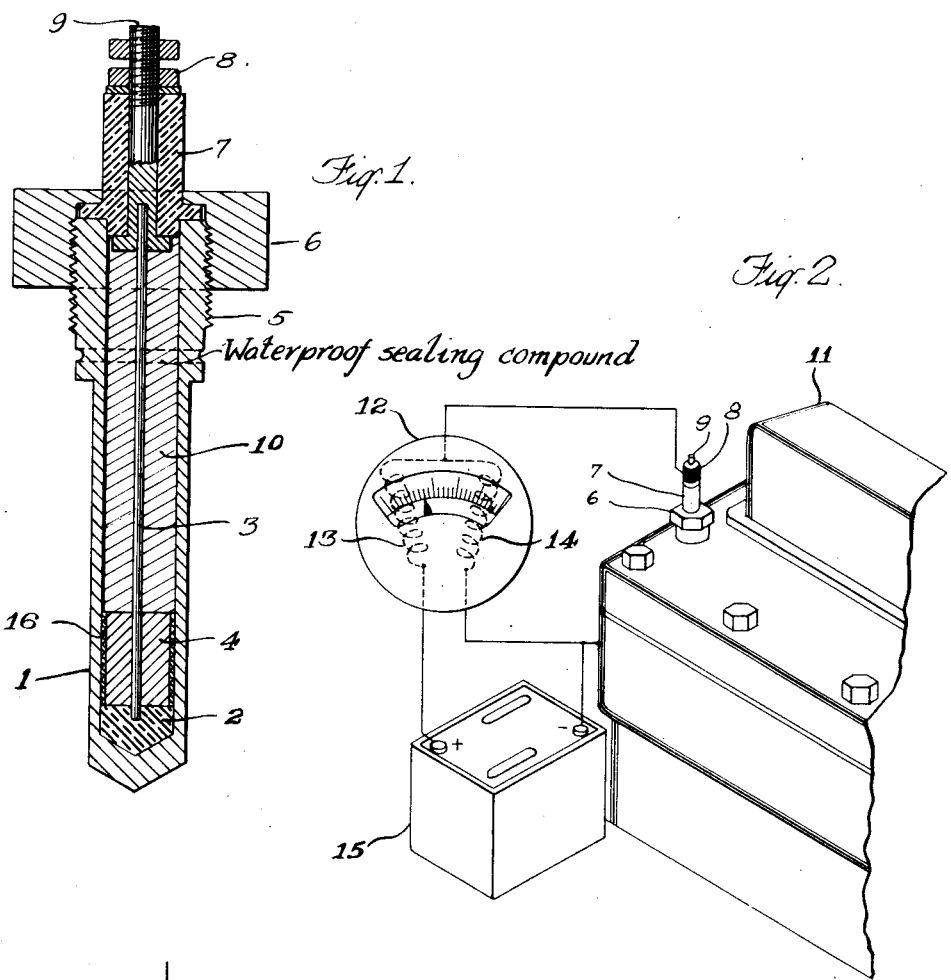
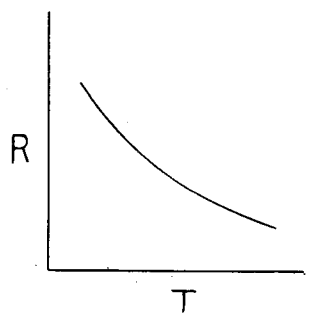

2,120,374

UNITED STATES PATENT OFFICE 2,120,374

ELECTRICAL PYROMETER

Samuel Ruben, New Rochelle, N. Y., assignor to Vega Manufacturing Corporation, Wilmington, Del., a corporation of Delaware Application October 23, 1931, Serial No. 570,746
Renewed July 24, 1936

2 Claims. (Cl. 201—76)

This invention relates to electrical pyrometers and heat indicating systems. Specifically, it relates to a device utilizing the resistance change of a metallic compound under the influence of heat to indicate temperature changes.

The object of the invention is to produce an accurate and durable pyrometer, although the device has a wide range of industrial uses otherwise, for instance as a relay to directly control such instruments as valves or switches.

A further object of the invention is to provide a device for measuring the temperature of an internal combustion engine and attachable either to the outside or through the engine casing without interfering with any of the parts thereof.

Another object of the invention is to provide an electrical device for measuring the temperature of the engine of an automobile.

Other objects of the invention and objects relating particularly to the method of constructing and assembling the various parts of the apparatus and the electrical connections therefor will be apparent as the description of the invention proceeds.

The characteristic property of the material employed for the temperature indicating resistance element is one having a high negative resistance coefficient. In the art, many compounds having this property have been applied for purposes and objects similar to those of applicants, but they have been subject to certain inherent limitations and infirmities such as variations from initially fixed values, failing to accurately repeat resistance values with changes in temperature, chemical instability and crystal structure changes with temperature variations, electrolytic decomposition, etc. In addition, it has been difficult to reproduce units within close limits.

My invention consists in utilizing as the electrical resistance material, an oxide of vanadium such as vanadium pentoxide, to overcome the above limitations. When fused and cast, I have found this material to be stable and accurately responsive to temperature variations, returning always to its initial resistance value. When employed in combination with a source of potential and a meter having an electrically balanced movement to compensate for voltage supply variations, it affords a thoroughly reliable temperature indicating means.

While this application describes and the drawing illustrates the use of the temperature responsive element chiefly in association with heat producing machines, such as internal combustion engines, the device is likewise practicable in association with cold producing machines, such as industrial and home type refrigerators.

In order to illustrate the invention, reference is made to the accompanying drawing, in which is shown a device for measuring the temperature in an internal combustion engine, such as an automobile motor.

Fig. 1 is a sectional view of the temperature responsive element and its housing.

Fig. 2 is a view showing the device locked into the top of a motor casing and in series with a meter and battery.

Fig. 3 is a graph showing the temperature resistance characteristics of the resistance element.

Referring more specifically to the drawing, in Fig. 1 the brass shell 1 houses at the lower end a porcelain plug 2 which partly supports and centers brass electrode rod 3 which extends into the head of and is further held in place and contacted by brass screw 9; the solidified mass of fused vanadium pentoxide 4 has been melted and poured into the brass electrode shell 1 and around electrode rod 3, the shell 1 having a threaded end 5 to enable the unit to be screwed into the motor casing; the resistance material 4 is protected by waterproof sealing compound 10; insulator top 7 is held in place by nut 8 and lock nut 6 which latter also serves to hold the entire device in place. In order to prevent surface oxidation, the contacting portion of the inner wall of shell electrode 1 may be lined with graphite 16; chromium plating is likewise effective for this purpose. If the shell is composed of metals not easily oxidized, however, this procedure is unnecessary.

In Fig. 2, the device is shown screwed into motor casing 11 adjacent the water jacket, the motor casing serving as a contact through lock nut 6; the meter 12 has an electrically balanced movement to compensate for voltage changes in the supply circuit, this being accomplished through the use of coils 13 and 14 shown in phantom; voltage is supplied from battery 15 the positive terminal of which is connected to coil 13, the negative side being connected to coil 14 and the casing of the motor 11; the circuit is completed through connection of the resistance device to the meter 12 through nut 8.

In the graph shown in Fig. 3, R represents the resistance and T the temperature.

In operation of the device as connected in Fig. 2, at ordinary cool temperature, with the engine and the vanadium pentoxide cold, the device will pass little or no current from the battery. When the temperature of the engine begins to rise, however, the resistance of the vanadium pentoxide decreases, more current flows and the temperature is thereby relatively indicated on the meter.

I claim:

1. An electrical temperature indicating device comprising a tubular metal shell having an electrically conducting lining of a material difficult to oxidize on its inner contacting surface and constituting one electrode, a resistance element composed of a single solid and uniform mass of fused vanadium pentoxide cast into said shell and intimately contacting said lining, and a cooperating electrode contacting said vanadium pentoxide and suitably insulated from the shell electrode, the length of said pentoxide mass exceeding the inner diameter of said shell.

2. In an electrical temperature indicating device including a tubular metal shell having an electrically conducting lining of a material difficult to oxidize on its inner contacting surface and constituting one electrode, and a second electrode insulated from the shell electrode, a resistance element comprising a single solid and uniform mass of fused vanadium pentoxide cast into said shell, the length of said pentoxide mass exceeding the diameter thereof.

SAMUEL RUBEN.